UNITED STATES PATENT OFFICE.

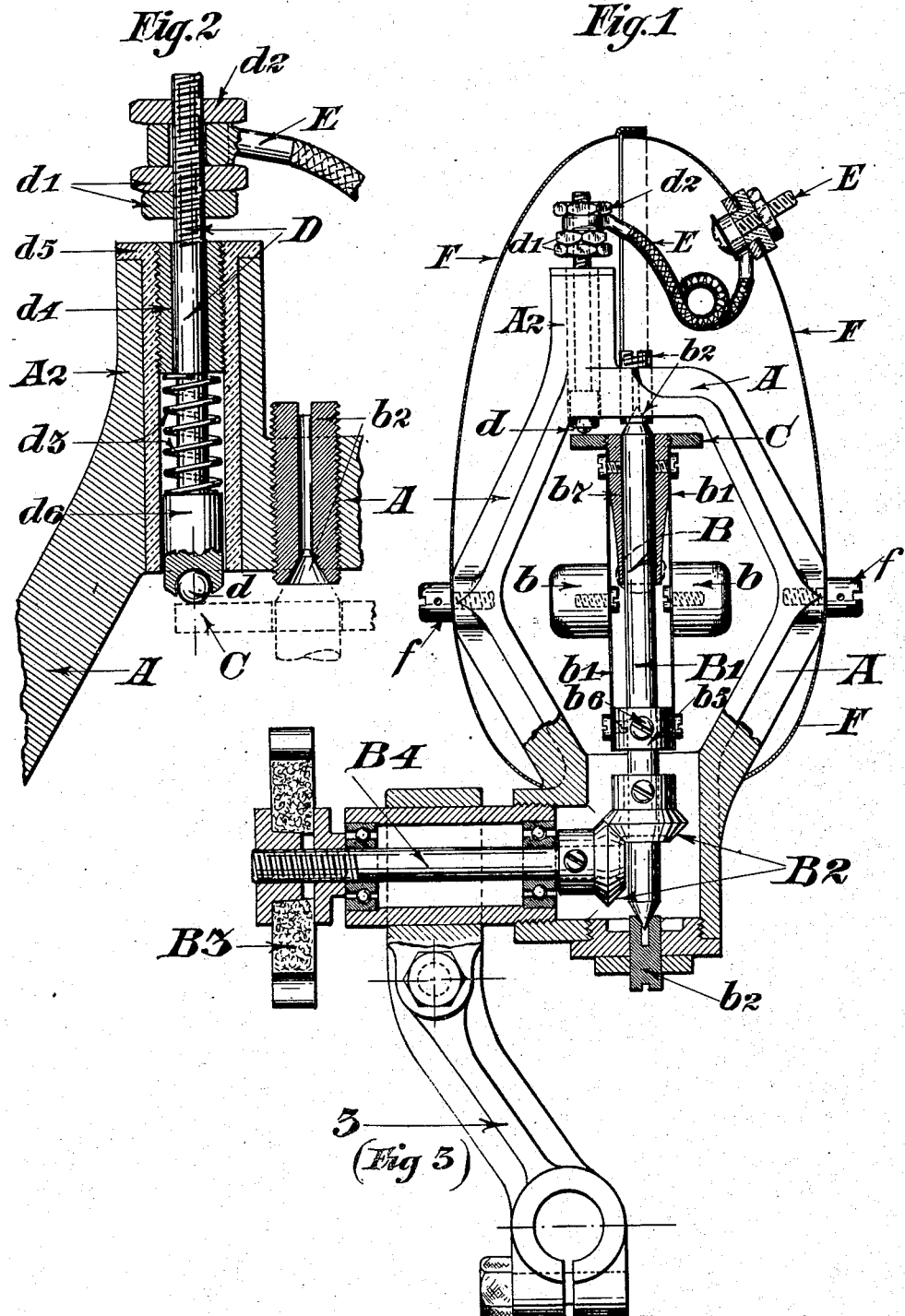

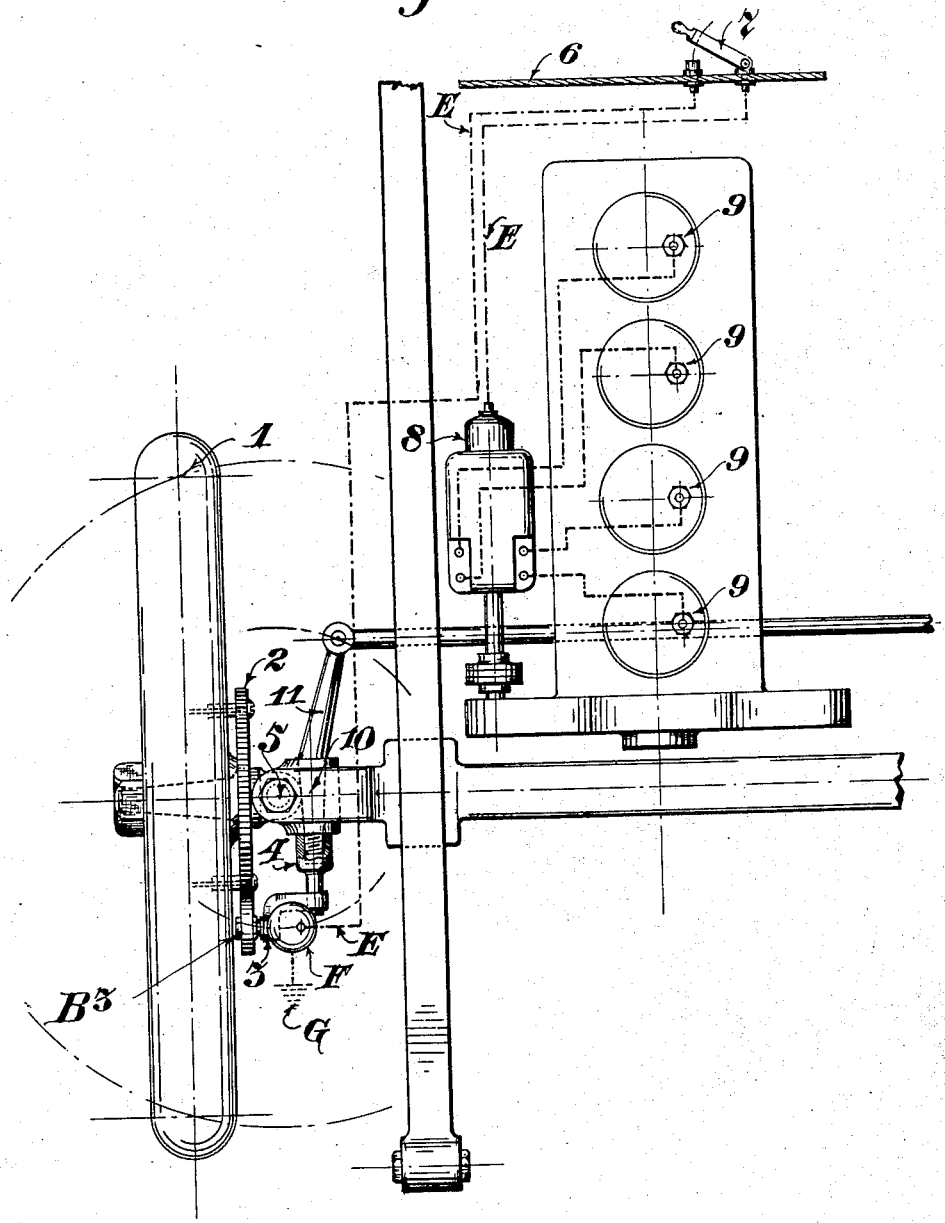

HENRY C. HILL, OF CINCINNATI, OHIO.

AUTOMOBILE-SPEED CONTROLLER.

1,400,062.  Specification of Letters Patent.  Patented Dec. 13, 1921.

Application filed December 22, 1920. Serial No. 432,555.

*To all whom it may concern:*

Be it known that I, HENRY C. HILL, a citizen of the United States, residing in Cincinnati, Ohio, have invented certain Improvements in Automobile-Speed Controllers, of which the following is a specification.

My invention relates particularly to devices intended to limit the travel or road speed of automobiles, to comply with police regulations in the larger cities, and to conserve the safety of pedestrians, and automobile drivers and passengers. By the use of the device the rate of travel of an automobile can be limited to any lawful speed required by statute or ordinance, beyond which speed the machine cannot be driven by a reckless or indifferent driver. The rate of travel or road speed is in some police regulations limited to 15 or 20 miles per hour.

The device can be attached by means of standard parts to any make or type of automobile, and is dependent in its operation only upon the speed at which the machine is driven regardless of the speed of the motor engine.

The object of my invention is to provide a simple practical device which can readily and conveniently be attached to any automobile and adjusted and fixed for any legal maximum speed of machine, to operate by automatically opening and closing the electric circuit to the spark plugs.

In the accompanying drawings, Figure 1, is a full size partial vertical sectional elevation of the speed controller. Fig. 2, is an enlarged vertical section of the mechanism which opens and closes the electric circuit to the spark plugs of the automobile engine. Fig. 3, is a plan view of the several parts of an automobile, including my improved speed controller, necessary to the operation of the device when connected with and driven from one of the steering (or front) wheels of the machine.

Similar letters refer to similar parts in Figs. 1 and 2. Numbers are used to designate certain parts in Fig. 3.

The device consists essentially of a small centrifugal spring governor of the well known "Pickering" type, such as is used to regulate the speed of talking machines, etc., driven by a ring gear or spur wheel attached to one of the front or steering wheels of an automobile, or by a suitable gear attached to any rotating shaft between the clutch and driving wheels of the machine. The governor by expanding and contracting with increase and diminution of speed causes a circular disk attached to and revolving with the movable sleeve of the governor to move down and up on the governor shaft according to speed. The revolving and vertically sliding disk supports by impingement on its upper surface a vertical sliding stem furnished with a ball bearing at its lower end which rests upon and revolves with the disk. The downward travel of the stem is limited and determined by a pair of lock nuts on the upper end, which acting as a shoulder or stop, brings up against the boss or guide in which the stem is mounted, whenever the revolving disk attached to the spring governor is drawn down by expansion of the governor balls, so that the ball bearing in the lower end of the sliding stem no longer rests upon the disk, when the electric circuit to the spark plugs of the engine is automatically opened or broken. The revolving disk rises by reduction of speed, and contraction of the governor balls, until the ball bearing on the vertically sliding stem again rests on and revolves with the disk, when the electric circuit to the spark plugs of the engine is automatically closed, and the operation of the engine resumed. Contact between the ball bearing in the lower end of the sliding stem and the revolving disk on the movable governor sleeve is secured by a light spiral spring around the sliding stem, which rests on a shoulder formed on the lower end of the stem, and reacts against a metal gland or thimble screwed into a non-conducting bushing, which is forced into the guide or boss for insulation of the sliding stem. This non-conducting bushing of any suitable insulating material, at its lower end forms a guide for the sliding stem, and at its upper end contains the gland which forms the abutment for the spiral spring, and also the guide for the upper part of the sliding stem. The primary ground wire of the electric circuit to the spark plugs is securely attached to the upper end of the sliding stem, and by alternate contact and non-contact of the revolving disk and sliding stem the electric circuit to the spark plugs is opened and closed.

Referring to the drawings, Fig. 1 and Fig. 2, A, is the frame in which is mounted the "Pickering" spring governor B, consisting of a vertical shaft "B¹" driven by miter gears "B²" spur pinion, "B³" and horizontal shaft "B⁴". The pinion gear "B³" derives motion from a "ring" gear 2, Fig. 3. The shaft "B¹" is provided with pivot bearings "b²,b³". The collar "b⁵" at the lower end of shaft "B¹" is rigidly attached to the shaft by set screws "b⁶" or in any other convenient manner, and revolves with the shaft, the sleeve "b⁷" is loose on shaft "B¹" and while revolving at the same speed as the shaft, is free to move down and up on the shaft as the governor balls "b, b," and springs "b¹", "b¹" revolve and expand or contract, according as the speed of the governor is increased or diminished, by the travel speed of the front wheel 1, and of the automobile. Attached to the movable sleeve "b⁷" is a circular disk "C" which revolves with the sleeve and governor.

Riding on disk "C" is a ball bearing "d", mounted in the lower end of the vertical moving stem "D" which bearing "d", impinges upon and revolves with the disk "C". The spiral spring "d³", rests upon the shoulder "d⁶", formed at the lower end of the stem "D", and is slightly compressed by the metal gland "d⁴", screwed into the upper end of the insulating bushing "d⁵", which keeps the ball bearing "d", always in contact with the disk "C" until by the speed of the governor "B", the balls "b" are expanded, and the sleeve "B⁷" and disk "C" are drawn down so far as to cause the lock nuts "d¹" to bring up on the top of the boss "A²" and thus restrain further downward travel of the stem "D". The travel of the sliding stem will depend upon the travel speed of the automobile, and after the stop or shoulder on the stem is drawn down to the boss "A²", a slight increase of automobile and governor speed, will draw the disk "C", entirely away (down) from the ball bearing "d", and open the electric circuit to the spark plugs through the primary wire or cable "E". With the loss of the spark the motor engine will sputter or stop, whereupon the operator or driver will be compelled to reduce the flow of gasolene to the engine until a travel speed is obtained which is less than the limiting speed to which the controller is adjusted. To reduce friction and increase the efficiency and durability of the speed controller, the horizontal shaft "B⁴", is mounted in ball bearings as clearly shown.

To avoid displacement in service, the lock nuts "d¹" are tinned on the opposing faces and after adjustment on the threaded stem "D", to the required limiting speed of the automobile, are firmly soldered together. The shield or cover "F" is made in two semicircular halves of thin sheet metal put together on a rubber gland, and attached to the frame "A", of the controller, by screws "f, f," and may be sealed by the maker or police department, to prevent tampering with the speed adjustment. This shield also forms a dust and water proof protector to the controller.

The frame "A", may be made of bronze, aluminum, malleable iron, or any suitable metal, and may be a drop forging if the service of the controller should require it. The electric current "E", to the spark plugs may be furnished by the generally used magneto, by batteries, or by any other approved method. The device is adaptable to motor cycles and any type of motor vehicle which requires for its operation spark plugs and an electric current.

It is obvious that a spring governor "B", and the spring actuated stem "D", of the type shown would operate quite as well if placed in a horizontal position as they will if placed in the vertical position shown in Figs. 1 and 2, and described in the specification. Some applications of the speed controller may require it to be placed in a horizontal position or at an angle less than 90 degrees to the horizontal.

Referring to Fig. 3, which is generally diagrammatic, 1, represents the right front or steering wheel of an automobile. 2, is the ring gear attached to the spokes or web of the wheel 1, which engages with the spur pinion "B³", attached to the horizontal driving shaft "B⁴" of the governor "B", see Fig. 1. 3, is a standard bracket clamped to the standard arm 4, and to the horizontal projection "A¹" of the frame "A", of the controller. The details 3, and 4, Fig. 3, and "B³", Fig. 1, are substantially the same as required for attachment of the customary speedometer to automobiles. F, is the shell or cover of the controller which for the present may be regarded as the assembled controller, from which proceeds the primary wire "E", of the electric circuit through switch 7, to the magneto 8. G, is the ground connection. 9, 9, 9, 9, are the spark plugs connected in the secondary electric circuit from magneto 8, as clearly shown. 10, is the usual taper spindle which connects the steering arm 11, with the standard knuckle upon which the wheel 1, is mounted. 6, is the panel board of an automobile.

7, is a switch mounted on the panel board 6, in the line of the wire "E." The equivalent of this switch is found on all automobiles. When the switch 7, is open as shown, the electric circuit to the spark plugs 9, 9, is broken, and when the switch is closed the circuit to the spark plugs is restored to fire the mixture of gasolene and air in the engine cylinders. The switch 7, is opened and closed by hand while the controller "F", Fig. 3, and in detail Figs. 1 and 2, opens and closes the electric circuit automatically, according to the speed at which the automobile is being driven. If above a predetermined limiting speed the controller automatically opens the circuit, and prevents the spark plugs 9, 9, from performing their usual function, and upon a reduction of automobile speed the circuit is automatically closed, and the function of the spark plugs 9, 9, restored. The controller is in fact an automatic switch depending for its operation on the speed of the automobile, opening the electric circuit when the limiting speed is reached and closing it when it is at or below this speed.

What I claim as my invention is;

1. In a speed controller for automobiles a centrifugal spring governor containing a pivoted vertical shaft, upon the lower end of said shaft a rigidly attached collar, upon the upper end of said shaft a movable sleeve, the rigid collar and movable sleeve being joined by two or more flat metal springs, said springs being provided with metal balls or weights at their mid-lengths, so arranged and operating that when the metal balls and springs expand by revolution of the governor the movable sleeve is drawn downward on the governor shaft, a circular disk attached to said movable sleeve upon which rides a vertically sliding stem, said stem being insulated from the body of the governor and provided with lock nuts to limit the downward travel and break contact between the lower end of said stem and the revolving disk, when the speed of the governor is such that the disk is drawn so far downward that the sliding stem no longer rides on it, and means for connecting said sliding stem with the primary wire of the electric circuit to the spark plugs of an automobile, substantially as described.

2. In a speed controller for automobiles, a centrifugal spring governor the lower end of which is rigidly attached to a shaft and the upper end having a sleeve which revolves with the governor and is free to move down and up on the shaft, said governor shaft being mounted in suitable bearings, and said revolving movable sleeve provided at its upper end with a circular disk firmly attached to and moving with said sleeve and governor, in combination with a spring actuated sliding stem moving in an insulated bushing mounted in the frame of the governor, said stem being provided at its lower end with a roller bearing riding upon and revolving with said disk, and at its upper end having two lock adjusting nuts movable on the threaded sliding stem, to adjust the travel of the stem to a desired limiting speed of automobile, and further having a nut or its equivalent for attachment of the primary wire of the electric circuit conveying current to the spark plugs of an automobile, the whole so arranged, that contact of the ball bearing and the circular disk is broken whenever the revolutions of the governor and speed of the automobile exceeds a pre-determined limit, substantially as described.

3. In a speed controller for automobiles a centrifugal spring governor containing a pivoted shaft, upon the lower end of said shaft a rigidly attached collar, upon the upper end of said shaft a movable sleeve, the rigid collar and movable sleeve being joined by two or more flat metal springs, said springs being provided with metal balls or weights on their mid-lengths, so arranged and operating that when the metal balls and springs expand by revolution of the governor the movable sleeve is drawn downward on the governor shaft, a circular disk attached to said movable sleeve upon which rides a vertically sliding stem, said stem being insulated from the body of the governor and provided with lock nuts to limit the downward travel and break contact between the lower end of said stem, and the revolving disk, when the speed of the governor is such that the disk is drawn so far downward that the sliding stem no longer rides or bears on it, means for connecting the primary wire of an automobile electric circuit to said sliding stem, and a sheet metal shell to prevent tampering with the adjustment of said sliding stem and to prevent the entrance of dust and moisture, substantially as described.

In testimony whereof, I affix my signature at Cincinnati, Ohio, this 13th day of Decr., 1920.

HENRY C. HILL.

Witnesses:
JOHN W. HILL,
W. H. MCCORMICK.